United States Patent
Hansen

(10) Patent No.: US 9,657,801 B2
(45) Date of Patent: May 23, 2017

(54) SHOCK ABSORBER PROTECTOR

(71) Applicant: John E. Hansen, Brush, CO (US)

(72) Inventor: John E. Hansen, Brush, CO (US)

(*) Notice: Subject to any disclaimer, the term of this patent is extended or adjusted under 35 U.S.C. 154(b) by 26 days.

(21) Appl. No.: 14/591,767

(22) Filed: Jan. 7, 2015

(65) Prior Publication Data

US 2015/0192185 A1    Jul. 9, 2015

Related U.S. Application Data

(60) Provisional application No. 61/924,828, filed on Jan. 8, 2014.

(51) Int. Cl.
*F16F 9/38* (2006.01)

(52) U.S. Cl.
CPC .......... *F16F 9/38* (2013.01); *Y10T 29/49826* (2015.01)

(58) Field of Classification Search
CPC .... F16F 9/38; F16F 9/3271; F16F 9/19; F16F 9/53; F16F 9/56; F16F 9/58; F16F 9/0254; Y10T 29/49826
USPC .............. 188/322.12, 266.1, 322.19, 322.22, 188/321.11; 267/220
See application file for complete search history.

(56) References Cited

U.S. PATENT DOCUMENTS

| | | | | |
|---|---|---|---|---|
| 3,830,347 A * | 8/1974 | Fader | ......................... | F16F 9/19 188/322.12 |
| 4,828,232 A * | 5/1989 | Harrod | ..................... | F16F 9/58 188/322.12 |
| 5,251,729 A * | 10/1993 | Nehl | ..................... | B60G 17/019 188/266.1 |
| 7,083,028 B2 * | 8/2006 | Fujita | ........................ | F16F 9/38 188/321.11 |
| 7,896,142 B2 * | 3/2011 | Vanhees | ................. | B60G 13/06 188/322.12 |
| 2002/0134627 A1 * | 9/2002 | Lisenker | ................... | F16F 9/53 188/266.1 |
| 2007/0187198 A1 * | 8/2007 | Born | ..................... | F16F 9/0254 188/322.12 |
| 2014/0332652 A1 * | 11/2014 | Hansen | ..................... | F16F 9/56 248/351 |

OTHER PUBLICATIONS

U.S. Appl. No. 61/924,828, filed Jan. 8, 2014.

* cited by examiner

*Primary Examiner* — Pamela Rodriguez

(74) *Attorney, Agent, or Firm* — Craig R. Miles; CR Miles P.C.

(57) ABSTRACT

A shock absorber protector including an arcuate member having opposing arcuate member interior and exterior faces bounded by an upper edge, a lower edge, a first side edge, and a second side edge, the arcuate member interior face defining an arc between the first and second side edges; a mounting flange outwardly extending from the arcuate member interior face proximate the lower edge; and an aperture element disposed in the mounting flange, the aperture element bounding an aperture element opening which communicates between opposing mounting flange interior and exterior faces.

14 Claims, 3 Drawing Sheets

FIG. 1A
FIG. 1B
FIG. 1C
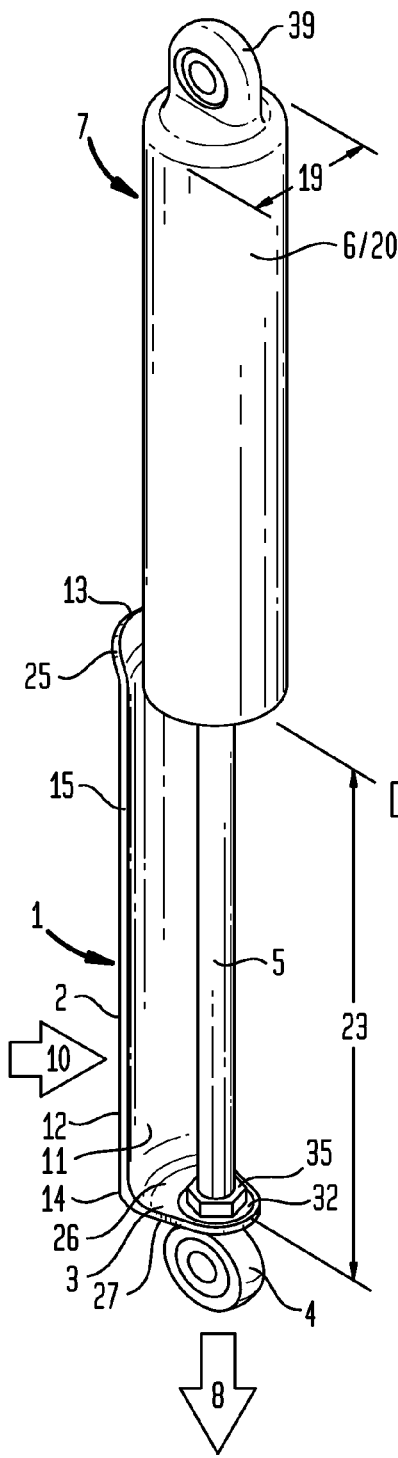
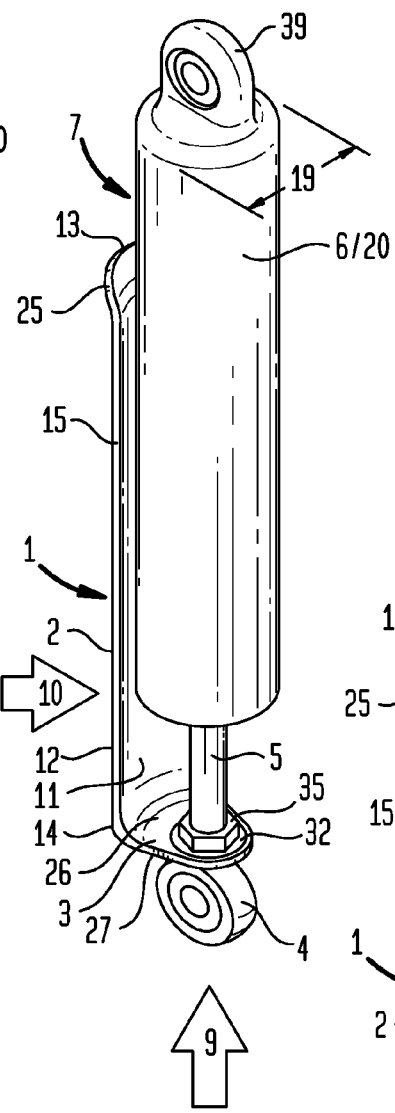
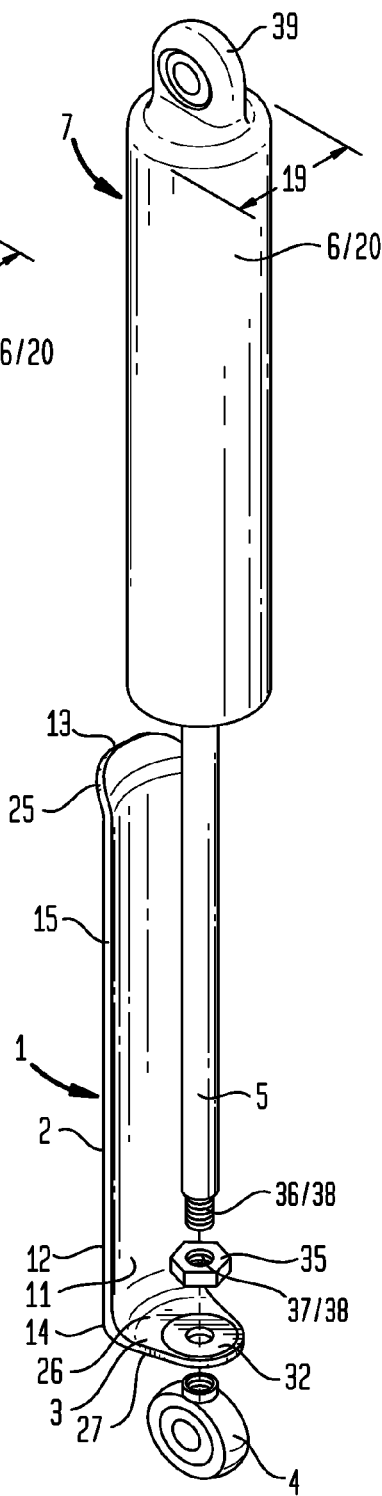

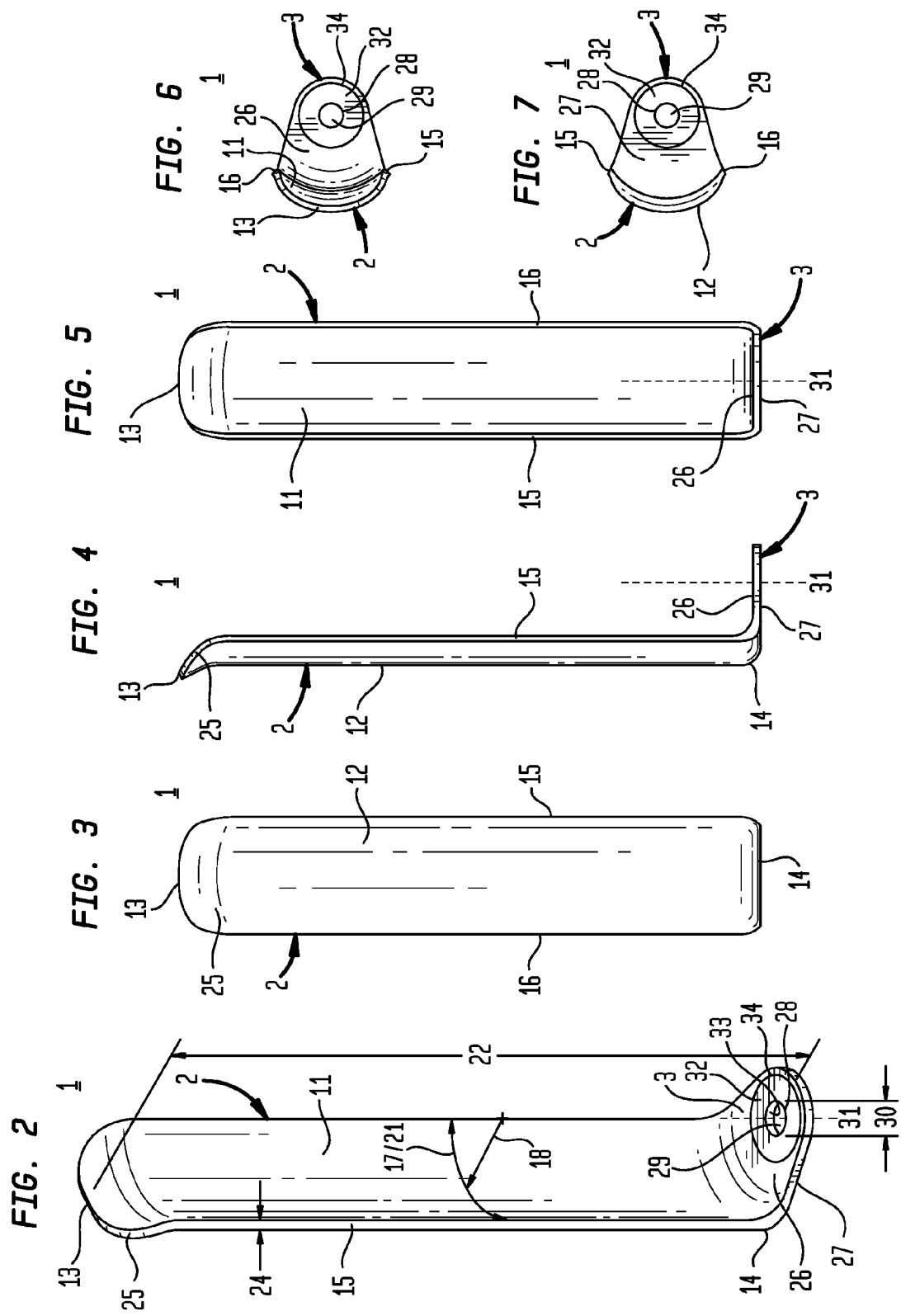

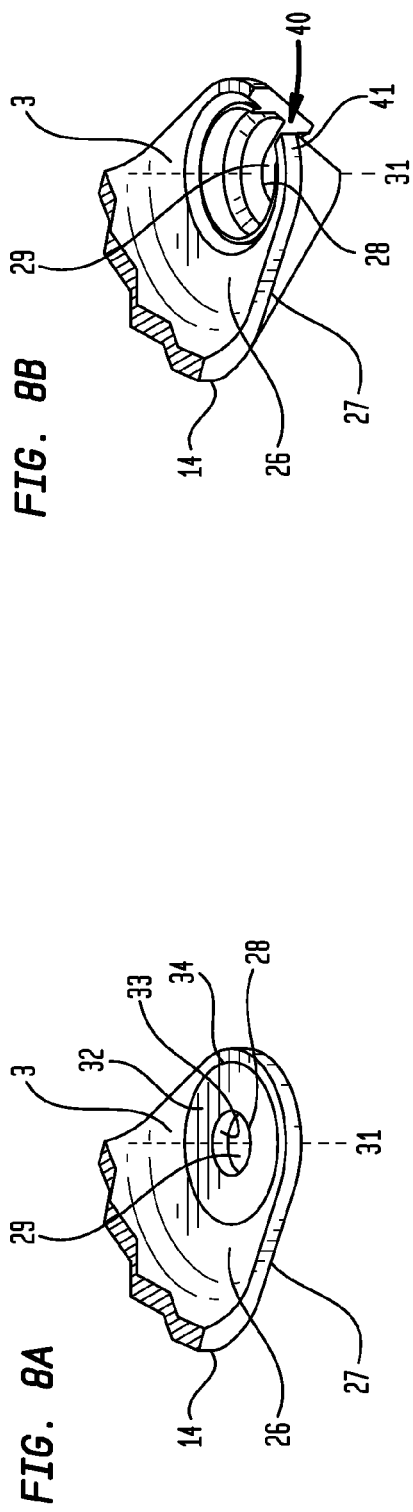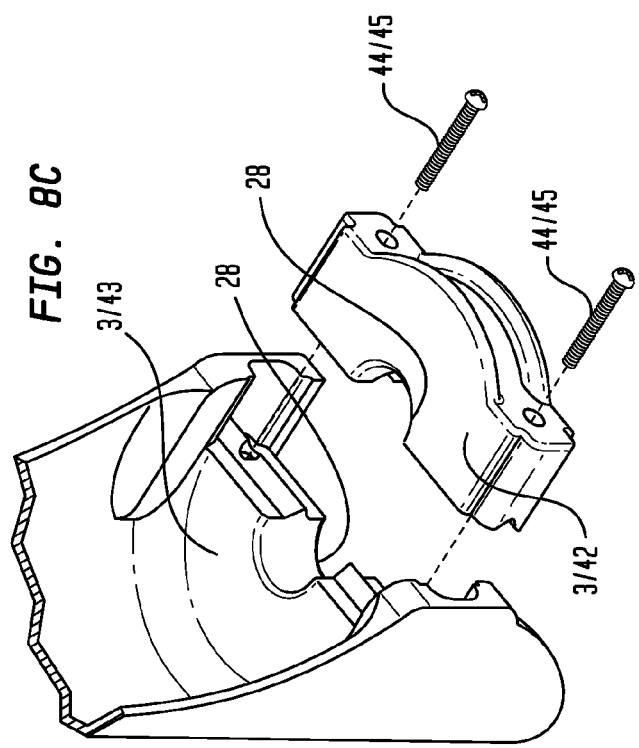

SHOCK ABSORBER PROTECTOR

This United States Non-Provisional Patent Application claims the benefit of U.S. Provisional Patent Application No. 61/924,828, filed Jan. 8, 2014, hereby incorporated by reference herein.

I. FIELD OF THE INVENTION

A shock absorber protector having an arcuate member joined to a mounting flange which couples proximate a lower mount of a piston rod extending from a cylinder of a shock absorber to dispose the arcuate member in adjacent radial relationship about the piston rod to protect the piston rod from contact with debris.

II. BACKGROUND OF THE INVENTION

Conventional shock absorbers include a piston slidably disposed within a cylinder interior chamber of a cylinder. A piston rod connected to the piston extends out of a cylinder first end of the cylinder. Damping forces can be generated by the shock absorber during an extension stroke in which the piston travels toward the cylinder first end, correspondingly extending the piston rod from the cylinder first end, and during a compression stroke in which the piston travels toward an opposing cylinder second end, retracting the piston rod within the cylinder interior chamber.

A conventional shock absorber may be disposed between a frame and a wheel of a vehicle. As an example, the cylinder can include upper mount which can be coupled to the frame of the vehicle while the piston rod can include a lower mount which can be coupled to an axle proximate the wheel of the vehicle. As the axle moves in relation to the sprung mass of the vehicle, the piston rod extends to a lesser or greater extent outside of the cylinder.

Accordingly, the piston rod can be exposed to flying debris, such as rocks, sand, or other scrap material, during travel. This debris can contact the piston rod with sufficient forces to cause surface irregularities in the piston rod, such as pits, scratches, dents, or the like, or combinations thereof. These surface irregularities can act on the piston rod seal as the piston rod repeatedly extends and retracts from the cylinder first end, resulting in wear to the piston rod seal, whereby wear to the piston rod seal can allow hydraulic fluid to leak from the cylinder interior chamber. Additionally, failure of the shock absorber can cause damage to suspension components of the vehicle and can transmit unwanted vibration and jolts to the sprung mass of the vehicle.

Thus, a need exists for a shock absorber protector capable of protecting the shock absorber and, in particular the piston rod extending out of the cylinder, from debris.

III. SUMMARY OF THE INVENTION

A broad object of a particular embodiment of the invention can be to provide a shock absorber protector including an arcuate member having opposing arcuate member interior and exterior faces bounded by an upper edge, a lower edge, a first side edge, and a second side edge, the arcuate member interior face defining an arc between the first and second side edges; a mounting flange outwardly extending from the arcuate member interior face proximate the lower edge; and an aperture element disposed in the mounting flange, the aperture element bounding an aperture element opening which communicates between opposing mounting flange interior and exterior faces of the mounting flange.

Another broad object of a particular embodiment of the invention can be to provide a method of producing a shock absorber protector, the method including providing an arcuate member having opposing arcuate member interior and exterior faces bounded by an upper edge, a lower edge, a first side edge, and a second side edge, the arcuate member interior face defining an arc between the first and second side edges; outwardly extending a mounting flange from the arcuate member interior face proximate the lower edge; and disposing an aperture element in the mounting flange, the aperture element bounding an aperture element opening which communicates between opposing mounting flange interior and exterior faces of the mounting flange.

Another broad object of a particular embodiment of the invention can be to provide a method of using a shock absorber protector, the method including obtaining a shock absorber protector including an arcuate member having opposing arcuate member interior and exterior faces bounded by an upper edge, a lower edge, a first side edge, and a second side edge, the arcuate member interior face defining an arc between the first and second side edges; a mounting flange outwardly extending from the arcuate member interior face proximate the lower edge; and an aperture element disposed in the mounting flange, the aperture element bounding an aperture element opening which communicates between opposing mounting flange interior and exterior faces of the mounting flange; and receiving a piston rod extending from a cylinder of a shock absorber within the aperture element opening to dispose the arcuate member in adjacent radial relationship about the piston rod.

Naturally, further objects of the invention are disclosed throughout other areas of the specification, drawings, and claims.

IV. BRIEF DESCRIPTION OF THE DRAWINGS

FIG. 1A is an illustration of a particular embodiment of a shock absorber protector coupled to a shock absorber shown in an extension stroke.

FIG. 1B is an illustration of a particular embodiment of a shock absorber protector coupled to a shock absorber shown in a compression stroke.

FIG. 1C is an exploded view of the particular embodiment of the shock absorber protector shown in FIG. 1A and FIG. 1B which can be coupled to a shock absorber.

FIG. 2 is a perspective view of a particular embodiment of a shock absorber protector.

FIG. 3 is an exterior face view of a particular embodiment of a shock absorber protector.

FIG. 4 is a side view of a particular embodiment of a shock absorber protector.

FIG. 5 is an interior face view of a particular embodiment of a shock absorber protector.

FIG. 6 is top view of a particular embodiment of a shock absorber protector.

FIG. 7 is bottom view of a particular embodiment of a shock absorber protector.

FIG. 8A is a perspective view of a mounting flange of a particular embodiment of a shock absorber protector.

FIG. 8B is a perspective view of a mounting flange of a particular embodiment of a shock absorber protector.

FIG. 8C is a perspective view of a mounting flange of a particular embodiment of a shock absorber protector.

V. DETAILED DESCRIPTION OF THE INVENTION

Now referring primarily to FIG. 1A through FIG. 1C, which illustrate particular embodiments of a shock absorber protector (1) including an arcuate member (2) joined to a mounting flange (3), whereby the mounting flange (3) can couple proximate a lower mount (4) connected to a piston rod (5) extending from a cylinder (6) of a shock absorber (7) to dispose the arcuate member (2) in adjacent radial relationship about the piston rod (5). The shock absorber (7) operates in an extension stroke (8) (as shown in the example of FIG. 1A) to extend the piston rod (5) from the cylinder (6) and in a compression stroke (9) (as shown in the example of FIG. 1B) to retract the piston rod (5) wholly or partially within the cylinder (6). Operation of the shock absorber (7) correspondingly generates travel of the shock absorber protector (1) to position the arcuate member (2) in relation to the piston rod (5) to protect the piston rod (5) from contact with debris (10).

Now referring primarily to FIG. 2 through FIG. 7, the shock absorber protector (1) includes an arcuate member (2) having opposing arcuate member interior and exterior faces (11)(12) bounded by an upper edge (13), a lower edge (14), a first side edge (15), and a second side edge (16), whereby the arcuate member interior face (11) defines an arc (17) between the first and second side edges (15)(16).

Now referring primarily to FIG. 2, as to particular embodiments, the arcuate member interior face (11) can define a generally circular arc (17) having a generally uniform radius of curvature (18) between the first and second side edges (15)(16). Typically, but not necessarily, the radius of curvature (18) can be in a range of between about 25 millimeters to about 100 millimeters.

Understandably, the radius of curvature (18) can vary depending upon a cylinder diameter (19) of the cylinder (6) of shock absorber (7) to which the shock absorber protector (1) couples, whereby the radius of curvature (18) can be correspondingly greater for a cylinder (6) having a greater cylinder diameter (19) and correspondingly lesser for a cylinder (6) having a lesser cylinder diameter (19). As shown in the examples of FIG. 1 and FIG. 2, upon coupling of the shock absorber protector (1) to the piston rod (5) extending from the cylinder (6) of the shock absorber (7), the radius of curvature (18) can be sufficiently greater than that of the cylinder (6) to dispose the arcuate member interior face (11) in adjacent spaced apart relation to a corresponding portion of a cylinder external surface (20) of the cylinder (6).

Again referring primarily to FIG. 2, as to particular embodiments, the arcuate member interior face (11) can define a generally circular arc (17) having an angle in a range of between about 90° to about 180°. Correspondingly, an arc length (21) between the first and second side edges (15)(16) can be lesser or greater, depending upon the level of protection desired or required to protect the piston rod (5) or cylinder (6) from debris (10) and to correspondingly decrease or increase the amount of weight of the shock absorber protector (1).

As to particular embodiments, the first and second side edges (15)(16) can typically, but not necessarily, be generally linear and dispose in substantially parallel relation to one another. As to other particular embodiments, the arc length (21) may be lessened approaching the upper edge (13) of the arcuate member (2), correspondingly altering the configuration of one or both of the first and second side edges (15)(16). For example, the first and second side edges (15)(16) may be linear but may not be in substantially parallel relation to one another. As to yet other particular embodiments, the first and second side edges (15)(16) may have non-linear configurations, depending upon the application.

Again referring primarily to FIG. 2, the arcuate member (2) can have an arcuate member length (22) extending between the upper and lower edges (13)(14). Typically, but not necessarily, the arcuate member length (22) can be in a range of between about 75 millimeters to about 300 millimeters, which may depend upon an extension stroke length (23) of the piston rod (5) (as shown in the example of FIG. 1A).

Again referring primarily to FIG. 2, the arcuate member (2) can have an arcuate member thickness (24) disposed between the arcuate member interior and exterior faces (11)(12). Typically, but not necessarily, the arcuate member thickness (24) can be in a range of between about 1.5 millimeters to about 5 millimeters, which may depend upon the material from which the shock absorber protector (1) is formed or the method of producing the shock absorber protector (1), or combinations thereof. As to particular embodiments, the arcuate member thickness (24) can be generally uniform throughout the arcuate member (2). As to other particular embodiments, the arcuate member thickness (24) can vary within the arcuate member (2).

Now referring primarily to FIG. 2 through FIG. 7, as to particular embodiments, the arcuate member (2) can further include an upper terminal lip portion (25) which outwardly extends approaching the upper edge (13). The outward extension of the upper terminal lip portion (25) can locate the upper edge (13) of the arcuate member (2) a greater distance from the cylinder external surface (20) of the cylinder (6) to which the shock absorber protector (1) couples relative to the arcuate member interior face (11), which may reduce or avoid engagement of the upper edge (13) with the cylinder external surface (20), even when forces applied to the arcuate member exterior face (12) urge the upper edge (13) to flex toward the cylinder external surface (20).

Again referring primarily to FIG. 2 through FIG. 7, the shock absorber protector (1) further includes a mounting flange (3) which outwardly extends from the arcuate member interior face (11) proximate the lower edge (14). As to particular embodiments, the mounting flange (3) extends radially outward from the arcuate member interior face (11) proximate the lower edge (14), whereby the mounting flange interior and exterior faces (26)(27) dispose in generally orthogonal relation to the arcuate member interior and exterior faces (11)(12).

Again referring primarily to FIG. 2 through FIG. 7, the shock absorber protector (1) further includes aperture element (28) disposed in the mounting flange (3), the aperture element (28) bounding an aperture element opening (29) which communicates between the mounting flange interior and exterior faces (26)(27) of the mounting flange (3).

As to particular embodiments, the aperture element (28) can bound a generally circular aperture element opening (29) having an aperture element opening diameter (30) (as shown in the example of FIG. 2) which can be sufficient to receive a piston rod (5) of a cylinder (6) of a shock absorber (7) (as shown in the examples of FIG. 1A and FIG. 1B). Typically, but not necessarily, the aperture element opening diameter (30) can be in a range of between about 6 millimeters to about 22 millimeters, depending upon the diameter of the piston rod (5).

As to particular embodiments, an aperture element opening center (31) of the aperture element opening (29) can dispose in generally coincident relation with an origin of the radius of curvature (18) of the arc (17) defined by the arcuate member interior face (11) between the first and second side edges (15)(16).

Again referring primarily to FIG. 2 through FIG. 7, as to particular embodiments, the mounting flange (3) of the shock absorber protector (1) can further include an annular member (32) having an annular member inner wall (33) which defines the aperture element (28), whereby the annular member (32) can be coupled to or formed as part of the mounting flange (3).

As an illustrative example, the annular member (32) can be located within a mold with the annular member inner wall (33) disposed to provide the aperture element (28) within the mounting flange (3). The molten material which forms the remaining portion of the mounting flange (3) can be introduced into the mold, coupling with an annular member outer wall (34) of the annular member (32) to provide a one-piece mounting flange (3). As to these particular embodiments, the annular member (32) can be, but is not necessarily, made of a metal and the remaining portion of the mounting flange (3) can be, but is not necessarily, made of a plastic.

Now referring primarily to FIG. 1A, FIG. 1B, and FIG. 1C, as to particular embodiments, an auxiliary annular member (35) can be coupled about the piston rod (5) proximate a piston rod end portion (36) distal from the cylinder (6) of the shock absorber (7). As to particular embodiments, the piston rod end portion (36) and an auxiliary annular member inner wall (37) of the auxiliary annular member (35) can each include matable spiral threads (38), thereby allowing the auxiliary annular member (35) to be rotatably engaged and positioned a distance from the piston rod end portion (36).

As to particular embodiments, the piston rod end portion (36) can be passed through the aperture element opening (29) disposed within mounting flange (3) to abut the mounting flange (3) adjacent to the auxiliary annular member (35). The lower mount (4) can be coupled to the piston rod end portion (36), for example via matable spiral thread engagement, and the mounting flange (3) can be secured between the auxiliary annular member (35) and the lower mount (4) in fixed relation to the shock absorber (7) by adjustably positioning either the lower mount (4) or the auxiliary annular member (35), or both, along the piston rod end portion (36). Accordingly, the arcuate member (2) joined to the mounting flange (3) can be in fixed radial relation about the piston rod (5) and the cylinder external surface (20).

Now referring primarily to FIG. 2 through FIG. 8A, as to particular embodiments, the mounting flange (3) of the shock absorber protector (1) can include mounting flange interior and exterior faces (26)(27) which substantially completely surround the aperture element opening (29), whereby the piston rod end portion (36) can be passed through the aperture element opening (29) proximate one of the mounting flange interior or exterior faces (26)(27) to couple the shock absorber protector (1) to the shock absorber (7).

Now referring primarily to FIG. 8B, as to particular embodiments, the mounting flange (3) of the shock absorber protector (1) can further include a radial slot (40) communicating between the mounting flange interior or exterior faces (26)(27) and between the aperture element opening (29) and a mounting flange periphery (41) of the mounting flange (3). To couple the shock absorber protector (1) to the shock absorber (7), the piston rod (5) can be passed through the radial slot (40) from the mounting flange periphery (41) and into the aperture element opening (29) to couple or clip the mounting flange (3) about the piston rod (5).

Now referring primarily to FIG. 8C, as to particular embodiments, the mounting flange (3) of the shock absorber protector (1) can further include mounting flange first and second portions (42)(43) which radially couple to one another to form the aperture element (28) defining the aperture element opening (29). To couple the shock absorber protector (1) to the shock absorber (7), the mounting flange first and second portions (42)(43) can be coupled to one another about the piston rod (5) such that the piston rod (5) is received within the aperture element opening (29). The mounting flange first and second portions (42)(43) can then be secured about the piston rod (5) by one or more securement elements (44), for example a screw (45) which secures the mounting flange first and second portions (42)(43) to one another.

As to particular embodiments, the shock absorber (7) including the shock absorber protector (1) or retrofitted with the shock absorber protector (1) can be disposed between a frame and a wheel of a vehicle. As such, the cylinder (6) can include an upper mount (39) which can be connected to the frame of the vehicle while the lower mount (4) coupled to the piston rod end portion (36) can be connected to an axle proximate the wheel of the vehicle.

A method of producing a particular embodiment of a shock absorber protector (1) can include providing an arcuate member (2) having opposing arcuate member interior and exterior faces (11)(12) bounded by an upper edge (13), a lower edge (14), a first side edge (15), and a second side edge (16), the arcuate member interior face (11) defining an arc (17) between the first and second side edges (15)(16); outwardly extending a mounting flange (3) from the arcuate member interior face (11) proximate the lower edge (14); and disposing an aperture element (28) in the mounting flange (3), the aperture element (28) bounding an aperture element opening (29) which communicates between opposing mounting flange interior and exterior faces (26)(27) of the mounting flange (3).

As to particular embodiments, the method of producing a particular embodiment of a shock absorber protector (1) can further include providing the arcuate member (2) as a first discrete piece; providing the mounting flange (3) as a second discrete piece; and coupling the first and second discrete pieces. As to particular embodiments, each of the arcuate member (2) and mounting flange (3) provided as corresponding first and second discrete pieces can be made from pressed or formed sheet metal, rubber, rubber-like material, plastic, plastic-like material, acrylic, polyamide, polyester, microfiber, polypropylene, polyvinyl chloride-based materials, silicone-based materials, or the like, or combinations thereof, which can be similar or dissimilar in thickness, and which can be coupled by one or more mechanical fasteners, such as rivets or screws, welds, adhesives, or the like, or combinations thereof.

As to other particular embodiments, the method of producing a particular embodiment of a shock absorber protector (1) can further include providing the arcuate member (2) and the mounting flange (3) as a unitary construct, whereby the unitary construct can be formed from pressed sheet metal, heat pressed or vacuum formed plastic, molded composite materials including fiberglass or carbon fiber and thermoset plastic, or the like, or combinations thereof.

As to yet other particular embodiments, the method of producing a particular embodiment of a shock absorber protector (1) can further include providing the arcuate member (2) and the mounting flange (3) as a unitary construct, whereby the unitary construct can be formed by injection molding any of a numerous and wide variety of injection moldable resins, such as: acrylonitrile butadiene styrene, polyethylene, polypropylene, nylon, polycarbonate, or the like, or combinations thereof.

Accordingly, depending upon the application, the type of material of the shock absorber protector (1) or elements of the shock absorber protector (1), the method of producing the shock absorber protector (1) or elements of the shock absorber protector (1), or the dimensional relations of the shock absorber protector (1) or elements of the shock absorber protector (1) can vary from one embodiment to another.

A method of using a particular embodiment of a shock absorber protector (1) can include obtaining a shock absorber protector (1) including an arcuate member (2) having opposing arcuate member interior and exterior faces (11)(12) bounded by an upper edge (13), a lower edge (14), a first side edge (15), and a second side edge (16), the arcuate member interior face (11) defining an arc (17) between the first and second side edges (15)(16); a mounting flange (3) outwardly extending from the arcuate member interior face (11) proximate the lower edge (14); and an aperture element (28) disposed in the mounting flange (3), the aperture element (28) bounding an aperture element opening (29) which communicates between opposing mounting flange interior and exterior faces (26)(27) of the mounting flange (3); and receiving a piston rod (5) extending from a cylinder (6) of a shock absorber (7) within the aperture element opening (29) to dispose the arcuate member (2) in adjacent radial relationship about the piston rod (5).

As to particular embodiments, the shock absorber (7) can be disposed between a frame and a wheel of a vehicle. As to particular embodiments, the cylinder (6) can include an upper mount (39) which couples to the frame of the vehicle, and the piston rod (5) can couple to a lower mount (4) which couples to an axle proximate the wheel of the vehicle.

As can be easily understood from the foregoing, the basic concepts of the present invention may be embodied in a variety of ways. The invention involves numerous and varied embodiments of a shock absorber protector and methods for making and using such shock absorber protectors, including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "protector" should be understood to encompass disclosure of the act of "protecting"— whether explicitly discussed or not—and, conversely, were there effectively disclosure of the act of "protecting", such a disclosure should be understood to encompass disclosure of a "protector" and even a "means for protecting". Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The teen "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the shock absorber protectors herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A shock absorber protector comprising:
an arcuate member having opposing arcuate member interior and exterior faces bounded by an upper edge, a lower edge, a first side edge, and a second side edge; wherein said arcuate member interior face defines an arc between said first and second side edges; and wherein said arc is configured to partially surround a piston rod;
a mounting flange outwardly extending from said arcuate member interior face proximate said lower edge; and
an aperture element disposed in said mounting flange, said aperture element bounding an aperture element opening which communicates between opposing mounting flange interior and exterior faces of said mounting flange.

2. The shock absorber protector of claim 1, wherein said arcuate member interior face defines a generally circular arc having a generally uniform radius of curvature between said first and second side edges.

3. The shock absorber protector of claim 2, wherein said radius of curvature has a range of between about 25 millimeters to about 100 millimeters.

4. The shock absorber protector of claim 2, wherein said generally circular arc has an angle in a range of between about 90° to about 180°.

5. The shock absorber protector of claim 1, wherein said arcuate member comprises an arcuate member length extending between said upper and lower edges, said arcuate member length having a range of between about 75 millimeters to about 300 millimeters.

6. The shock absorber protector of claim 1, wherein said arcuate member comprises an arcuate member thickness disposed between said arcuate member interior and exterior faces, said arcuate member thickness having a range of between about 1.5 millimeters to about 5 millimeters.

7. The shock absorber protector of claim 1, further comprising an upper terminal lip portion which outwardly extends approaching said upper edge.

8. The shock absorber of claim 1, wherein said mounting flange interior and exterior faces dispose in generally orthogonal relation to said arcuate member interior and exterior faces.

9. The shock absorber of claim 1, wherein said aperture element bounds a generally circular aperture element opening having an aperture element opening diameter sufficient to receive said piston rod extending from a cylinder of a shock absorber.

10. The shock absorber of claim 9, wherein said aperture element opening diameter has a range of between about 6 millimeters to about 22 millimeters.

11. The shock absorber of claim 9, wherein said aperture element opening has an aperture element opening center which disposes in generally coincident relation with an origin of a radius of curvature of said arc defined by said arcuate member interior face between said first and second side edges.

12. The shock absorber of claim 1, wherein said mounting flange further comprises an annular member having an annular member inner wall which defines said aperture element.

13. The shock absorber of claim 1, wherein said mounting flange further comprises a radial slot communicating between said mounting flange interior and exterior faces and between said aperture element opening and a mounting flange periphery of said mounting flange.

14. The shock absorber of claim 1, wherein said mounting flange further comprises mounting flange first and second portions which radially couple to one another to form said aperture element defining said aperture element opening.

* * * * *